(12) United States Patent
Choi

(10) Patent No.: US 7,711,352 B2
(45) Date of Patent: May 4, 2010

(54) AUTHENTICATION OF MOBILE STATION

(75) Inventor: Hyun-Kyung Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 418 days.

(21) Appl. No.: 11/328,784

(22) Filed: Jan. 9, 2006

(65) Prior Publication Data
US 2006/0154647 A1   Jul. 13, 2006

(30) Foreign Application Priority Data
Jan. 7, 2005   (KR) ............ 10-2005-0001752
Jan. 7, 2005   (KR) ............ 10-2005-0001753

(51) Int. Cl.
*H04M 1/66* (2006.01)
*H04M 1/68* (2006.01)
*H04M 3/16* (2006.01)
*H04W 4/00* (2009.01)

(52) U.S. Cl. .......... 455/410; 455/411; 455/435.1

(58) Field of Classification Search ......... 455/410, 455/411, 432.1
See application file for complete search history.

(56) References Cited

U.S. PATENT DOCUMENTS

| | | | |
|---|---|---|---|
| RE36,946 E | | 11/2000 | Diffie et al. |
| 6,189,099 B1 * | | 2/2001 | Rallis et al. ......... 713/172 |
| 6,356,753 B1 * | | 3/2002 | Kolev et al. .......... 455/411 |
| 6,665,530 B1 * | | 12/2003 | Broyles et al. ........ 455/411 |
| 7,010,699 B1 * | | 3/2006 | Agarwal et al. ....... 713/166 |
| 7,418,257 B2 * | | 8/2008 | Kim ..................... 455/411 |
| 2002/0009199 A1 | | 1/2002 | Ala-Laurila et al. |
| 2002/0072349 A1 | | 6/2002 | Geiselman et al. |
| 2002/0180583 A1 | | 12/2002 | Paatero et al. |
| 2004/0192256 A1 * | | 9/2004 | Kuwajima ............ 455/411 |

FOREIGN PATENT DOCUMENTS

| | | |
|---|---|---|
| EP | 1164810 | 12/2001 |
| FR | 2 855 895 A | 12/2004 |
| WO | WO 03/094562 | 11/2004 |

* cited by examiner

*Primary Examiner*—Vincent P Harper
*Assistant Examiner*—Marisol Figueroa
(74) *Attorney, Agent, or Firm*—Lee, Hong, Degerman, Kang & Waimey

(57) ABSTRACT

A method for processing authentication of a mobile station in a mobile communication system comprises determining whether an authentication state is inactivated, and requesting registration. The method also comprises receiving a result message from a network, and activating the authentication state according to the result message. The authentication state may be checked using a success flag or a fail flag. The success flag may be activated when the result message is a success message. The fail flag may be activated when the result message is a fail message. The activating the authentication state may comprise activating an authentication success state in response to activation of the success flag, and activating an authentication fail state in response to activation of the fail flag. The method may further comprise entering a lock state when the authentication state is activated as an authentication fail state.

15 Claims, 4 Drawing Sheets

AUTHENTICATION OF MOBILE STATION

CROSS-REFERENCE TO RELATED APPLICATIONS

Pursuant to 35 U.S.C. §119(a), this application claims the benefit of earlier filing date and right of priority to Korean Application Nos. 2005-0001752, filed on Jan. 7, 2005 and 2005-0001753, filed on Jan. 7, 2005, the contents of which are hereby incorporated by reference herein in their entirety.

FIELD OF THE INVENTION

The present invention relates generally to a mobile station and, more particularly, to authentication of a mobile station.

BACKGROUND OF THE INVENTION

Authentication of a mobile station is processed by information exchange between a base station (e.g., a wireless network) and a mobile station to verify the identity of the mobile station.

In a power-on mode, the mobile station performs registration authentication. If the registration authentication is successful, the wireless network transmits an authentication success message to the mobile station. The mobile station may thus be normally operated.

An authorized (e.g., legally produced) mobile station should be successfully authenticated. An unauthorized (e.g., illegally duplicated) mobile station uses an electronic serial number (ESN) and an authentication key of the authorized mobile station to access the wireless network. The authorized mobile station and the unauthorized mobile station both attempt registration authentication. The wireless network then transmits an authentication fail message to the unauthorized mobile station and the authorized mobile station. The authentication fail message may be a lock order message which locks both the unauthorized mobile station and the authorized mobile station, preventing further wireless communications by either mobile station.

Therefore, conventional authentication techniques undesirably lock the authorized mobile station. Furthermore, due to repeated attempts by the authorized mobile station to gain authentication, the load on the wireless network authentication system increases.

SUMMARY OF THE INVENTION

Accordingly, the present invention is directed to authentication of a mobile station that substantially obviates one or more problems due to limitations and disadvantages of the related art.

An object of the present invention is to provide authentication of a mobile station, such that an authorized mobile station may maintain normal operation, despite attempts by an unauthorized mobile station to gain authentication using identifiers belonging to the authorized mobile station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for processing authentication of a mobile station in a mobile communication system comprises determining whether an authentication state is inactivated, and requesting registration. The method also comprises receiving a result message from a network, and activating the authentication state according to the result message.

The authentication state may be checked using a success flag or a fail flag. The success flag may be activated when the result message is a success message. The fail flag may be activated when the result message is a fail message. The activating the authentication state may comprise activating an authentication success state in response to activation of the success flag, and activating an authentication fail state in response to activation of the fail flag. The method may further comprise entering a lock state when the authentication state is activated as an authentication fail state.

In another embodiment, a method for processing authentication of a mobile station in a mobile communication system comprises receiving an authentication result message, and identifying whether an authentication flag is activated. The method also comprises determining processing operation of the authentication result message based on the activated authentication flag.

The determining processing operation may comprise ignoring the authentication result message when the activated authentication flag is a success flag, and entering a lock state when the activated authentication flag is a fail flag. A mobile station under normal operation may ignore the authentication result message.

In yet another embodiment, a method for processing authentication of a mobile station in a mobile communication system comprises receiving an authentication message from a network that sets an authentication flag as an authentication success flag, if an authentication attempt is successfully processed. The method also comprises receiving an authentication message from the network that sets the authentication flag as an authentication fail flag, if the authentication attempt fails. The method also comprises operating, according to an authentication determination by the network, based on a status of the authentication flag.

The method may further comprise storing the authentication flag in a memory. Authentication may be attempted with the network upon application of power. The method may further comprise entering a lock state when the authentication attempt is denied by the network. The method may further comprise entering a power down state when the authentication attempt is denied by the network.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The term 'mobile station' encompasses mobile phones, handsets, PDAs (personal digital assistants), and computers, as well as any other devices with wireless communication capabilities. The mobile station may include a processor, a display, and an antenna, for example. The processor may be configured to perform techniques and/or steps described herein. Authentication of a mobile station is described below.

A registration authentication success flag and/or a registration authentication fail flag may be set in a memory of a mobile station. The mobile station determines whether to attempt registration authentication based on the state of the registration authentication fail flag. If the mobile station is unauthorized (e.g., illegally duplicated), repeated registration authentication attempts by repeated power off/on actions in the unauthorized mobile station are prevented, thereby preventing load increase on the wireless network authentication system. Furthermore, when power is applied to the authorized mobile station and registration authentication is attempted, if the authorized mobile station receives an authentication fail message caused by registration authentication failure of the unauthorized mobile station, the authorized mobile station ignores the authentication fail message and maintains a normal operation state.

In an exemplary authentication process, when power is applied to a mobile station having an authentication key (e.g., A-key) and an electronic serial number (e.g., ESN), the mobile station attempts registration authentication. In the registration authentication, the mobile station and the wireless network perform an update procedure of shared secret data (e.g., SSD). When the SSD updated by the mobile station and the SSD updated by the wireless network are matching, the registration authentication succeeds. The mobile station then uses the newly-updated SSD for voice privacy and message encryption. The SSD is divided into SSD_A and SSD_B, for example. The SSD_A is used to support the authentication procedure, and the SSD_B is used to support the voice privacy and the message encryption.

Figure 1:
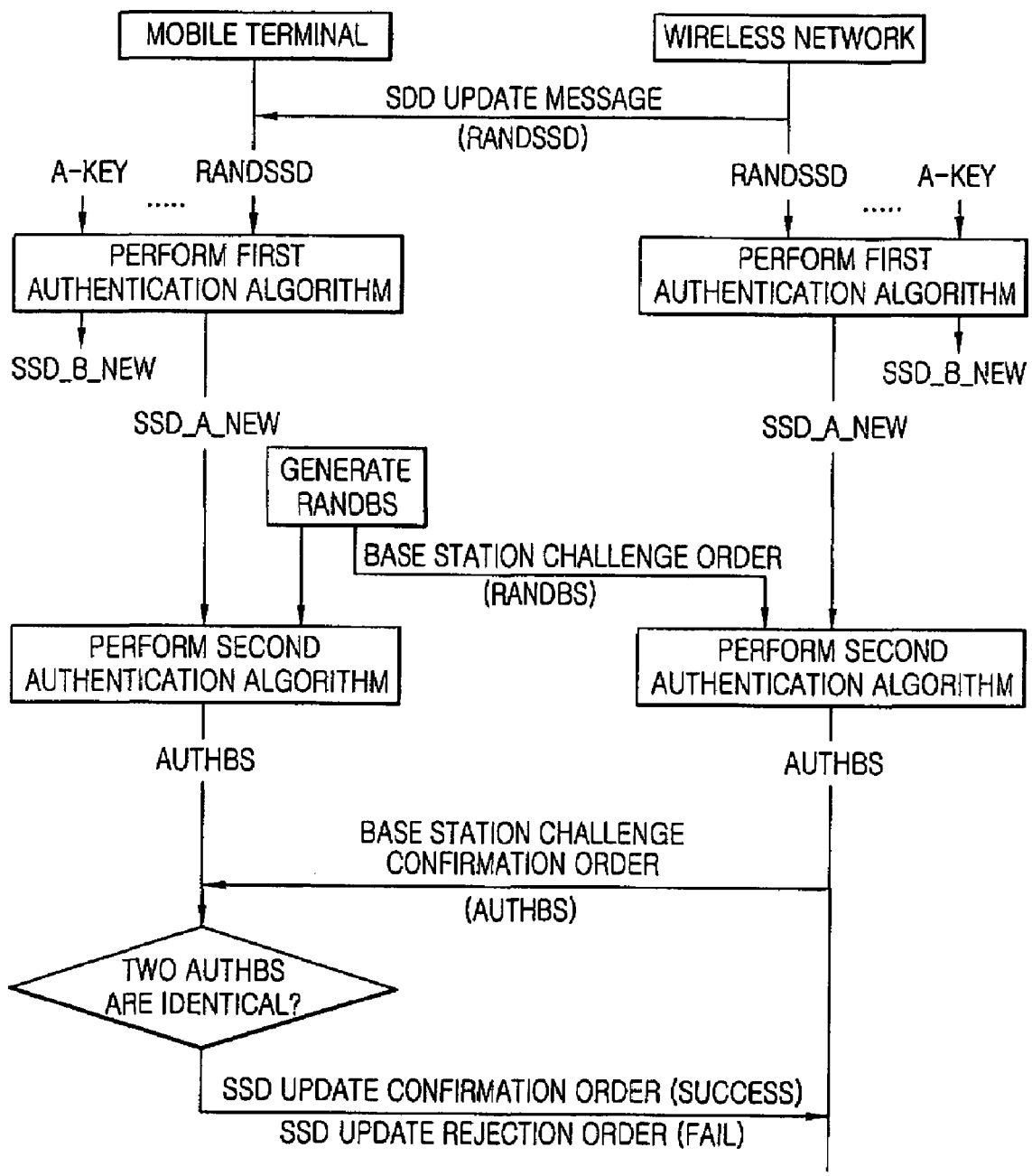
FIG. 1 is a flow diagram illustrating a method for updating shared secret data (SSD).

FIG. 1 is a flow diagram illustrating a method for updating shared secret data (SSD).

Referring to FIG. 1, when a mobile station attempts registration authentication, the wireless network transmits an SSD update message including a random number (e.g., RAND_SSD) to the mobile station. An SSD update procedure is thereby started.

When receiving the SSD update message including the random number RAND_SSD, the mobile station initializes stored SSD_A and SSD_B. Thereafter, the mobile station inputs the initialized SSD_A, the received random number RAND_SSD, the A-key, an ESN and a mobile identification number (e.g., MIN) to a first authentication algorithm (e.g., SSD generation procedure), thereby processing a first authentication. The mobile station generates new SSD, e.g. SSD_A_NEW and SSD_B_NEW, by the first authentication. The mobile station then generates a random number (e.g., RANDBS) by a random number generation function, and transmits the generated random number RANDBS to the wireless network through a base station challenge order. It shall be understood that the present invention is not limited to SSD, but may utilize any appropriate authentication technology.

Figure 2:
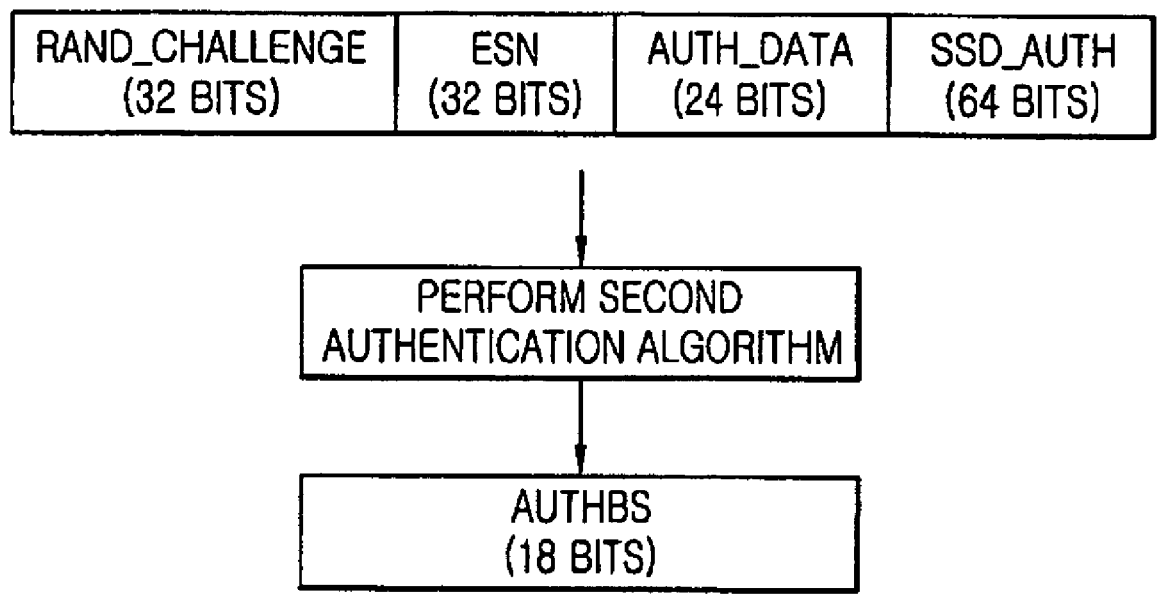
FIG. 2 is a flow diagram illustrating a method for generating new authentication information for a mobile station.

FIG. 2 is a flow diagram illustrating a method for generating new authentication information for a mobile station.

Referring to FIG. 2, the mobile station inputs the random number RANDBS to a RAND_CHALLENGE parameter, for example, the SSD_A_NEW to an SSD_AUTH parameter, for example, the ESN to an ESN parameter, for example, and the MIN to an AUTH_DATA parameter, for example, thereby processing secondary authentication by a secondary authentication algorithm (e.g., Auth_Signature procedure). The mobile station generates new authentication information (e.g., first AUTHBS) by the secondary authentication.

The wireless network, after transmitting the SSD update message including the random number RAND_SSD to the mobile station, initializes the stored SSD_A and SSD_B, and inputs the initialized SSD_A, the transmitted random number RAND_SSD, the A-key of the mobile station, the ESN of the mobile station and the MIN of the mobile station to a first authentication algorithm, thereby processing the first authentication. The wireless network generates new SSD, e.g., SSD_A_NEW and SSD_B_NEW, by the first authentication.

Thereafter, the wireless network inputs the random number RANDBS transmitted from the mobile station through the base station challenge order, the SSD_A_NEW, the ESN of the mobile station and the MIN of the mobile station to a second authentication algorithm, thereby processing the second authentication. The wireless network generates new authentication information (e.g., second AUTHBS) by the secondary authentication. The first and second authentication algorithms of the mobile station may be the same as the first and second authentication algorithms of the wireless network.

The wireless network transmits the second authentication information (e.g., second AUTHBS) generated by the second authentication to the mobile station. The mobile station compares the second authentication information transmitted from the wireless network against the first authentication information generated by the mobile station. When the first authentication information matches the second authentication information, the mobile station determines that SSD update has succeeded, and notifies SSD update success to the wireless network through an SSD update confirmation order, for example. However, when the first authentication information differs from the second authentication information, the mobile station determines that SSD update has failed, and notifies SSD update failure to the wireless network through an SSD update rejection order.

When receiving the SSD update confirmation order from the mobile station, the wireless network updates the SSD_A and SSD_B with the SSD_A_NEW and SSD_B_NEW, and transmits an authentication result message notifying registration authentication success to the mobile station. After successfully processing the SSD update and the registration authentication, the mobile station uses the updated SSD_B-

_NEW for call access services such as voice privacy and message encryption. However, when receiving the SSD update rejection order from the mobile station, the wireless network ignores the SSD_A_NEW and SSD_B_NEW, does not update the SSD_A and SSD_B, and transmits an authentication result message notifying registration authentication failure to the mobile station.

Authentication of an authorized mobile station and an unauthorized mobile station is described below with reference to FIG. 3, where the authorized mobile station is normally operated according to registration authentication success and the unauthorized mobile station attempts registration authentication.

Figure 3:
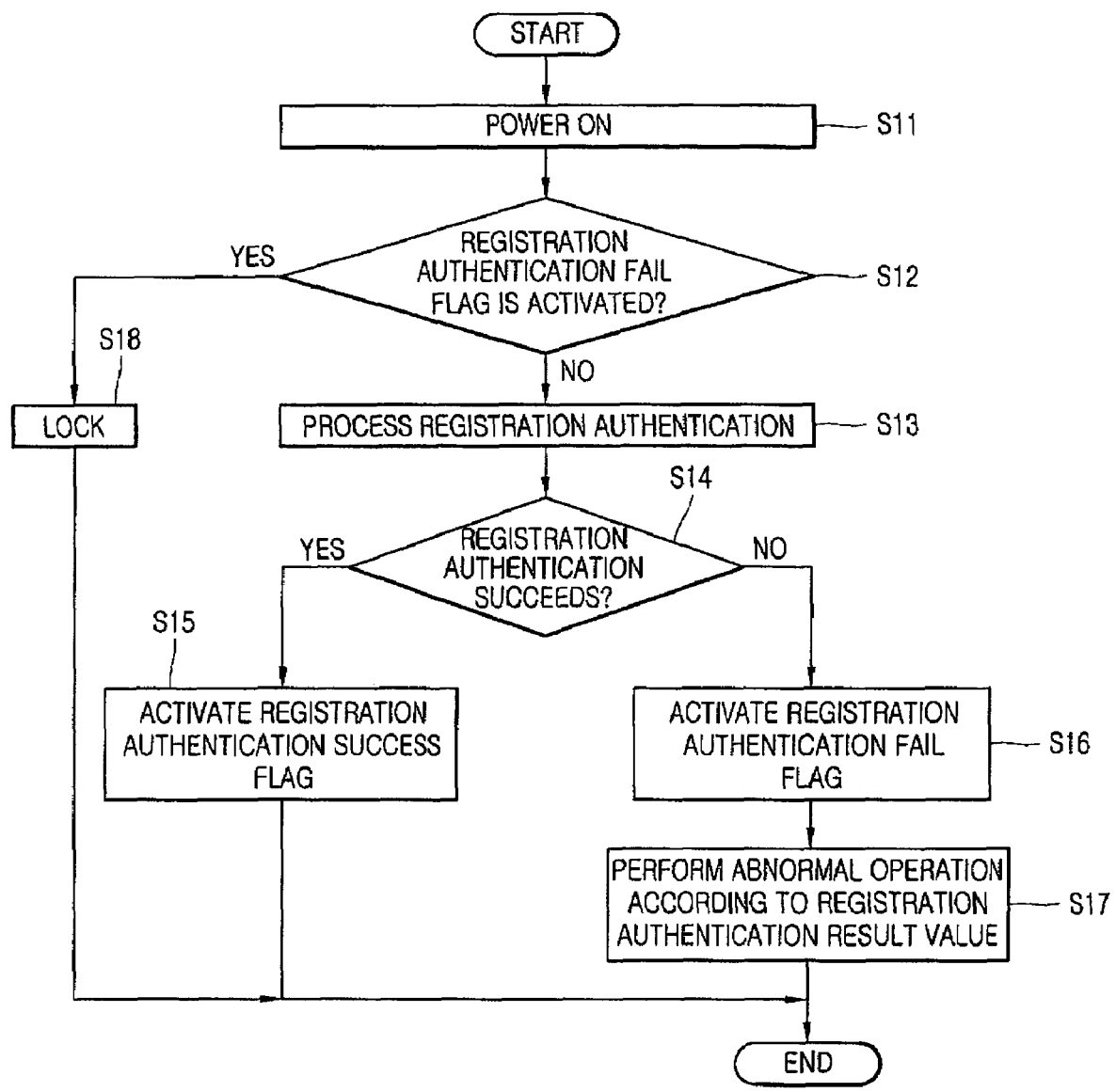
FIG. 3 is a flow diagram illustrating a method for processing authentication of a mobile station, according to an embodiment of the present invention.

FIG. 3 is a flow diagram illustrating a method for processing authentication of a mobile station, according to an embodiment of the present invention.

Referring to FIG. 3, upon receiving power (S11), the mobile station confirms a state of a registration authentication fail flag (S12). When the registration authentication fail flag has not been activated, the mobile station processes the registration authentication with the wireless network (S13).

When the mobile station is authorized, the registration authentication succeeds. An authentication success message is then transmitted from the wireless network as a registration authentication result. However, when the mobile station is unauthorized, the registration authentication fails, and an authentication fail message is transmitted from the wireless network as a registration authentication result. The authorized mobile station may thus be normally operated based on the registration authentication success. However, the unauthorized mobile station is rejected for registration authentication by the wireless network, and the wireless network transmits an authentication fail message. The authentication fail message may have a special value, such as 'power down', for example.

When the authentication result message from the wireless network is an authentication success message, the mobile station determines that the registration authentication has succeeded (S14), sets a registration authentication success flag in an active state (S15), and enters a normal operation state to perform call access services.

However, when the authentication result message from the wireless network is an authentication fail message, the mobile station determines that the registration authentication has failed (S14), sets a registration authentication fail flag in an active state (S16), and enters an abnormal operation state such as a lock state or power down state (S17).

However, referring to step S12, when the registration authentication fail flag has been activated, the mobile station may directly enter the lock state without processing the registration authentication (S18). Accordingly, in the case an unauthorized (e.g., illegally duplicated) mobile station, when power is repeatedly applied to the illegally duplicated mobile station, the wireless network authentication system does not repeatedly process the registration authentication, thereby conserving wireless network authentication resources.

Authentication where the authorized mobile station receives an authentication failure message caused by an authentication registration attempt by the unauthorized mobile station is described below with respect to FIG. 4.

Figure 4:
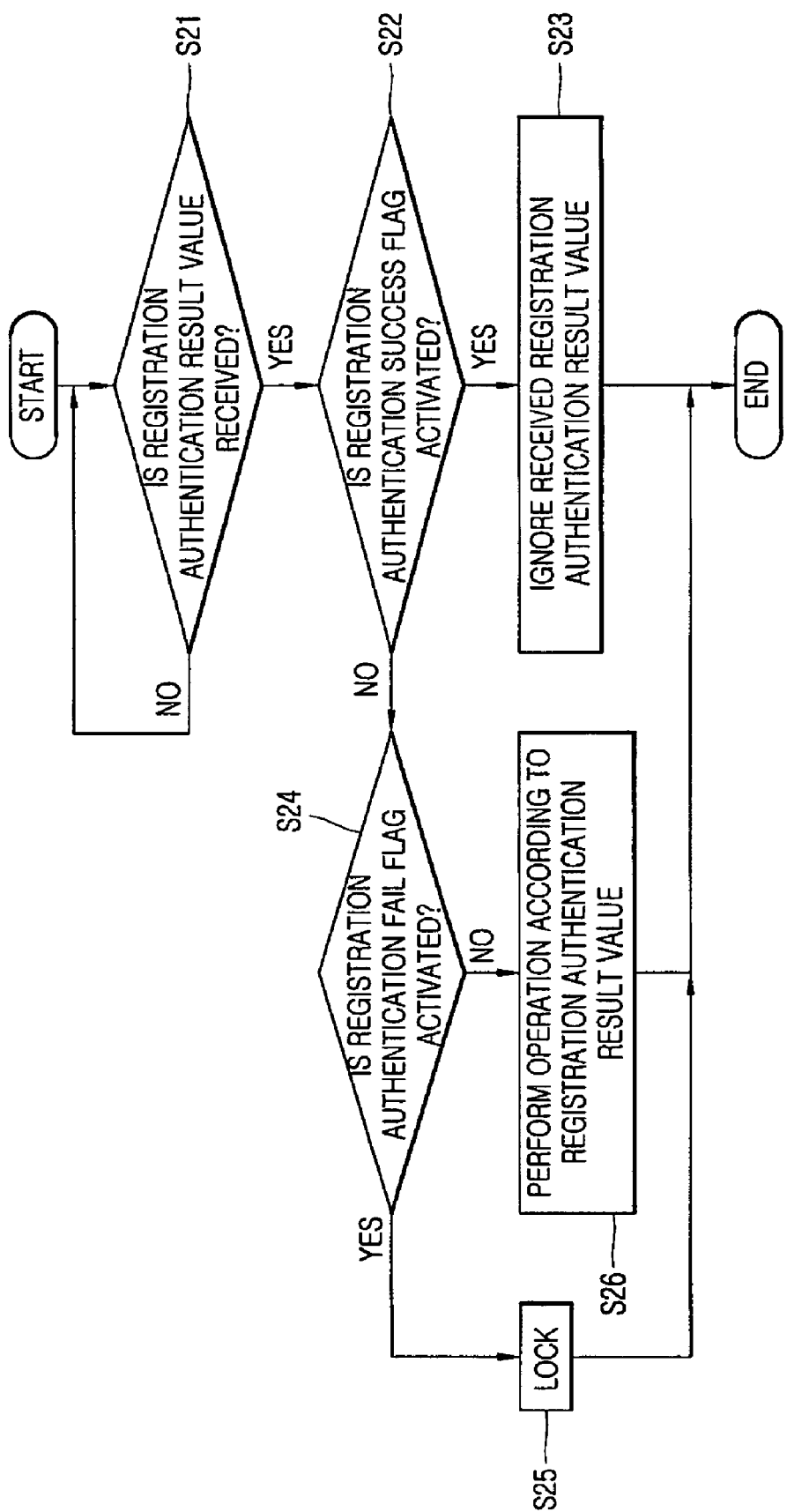
FIG. 4 is a flow diagram illustrating a method for processing, in an authenticated mobile station, an authentication fail message resulting from registration authentication failure of an unauthorized mobile station, according to an embodiment of the present invention.

FIG. 4 is a flow diagram illustrating a method for processing, in an authenticated mobile station, an authentication fail message resulting from registration authentication failure of an unauthorized mobile station, according to an embodiment of the present invention.

Referring to FIG. 4, upon application of power to a mobile station and receipt of an authentication result message (S21), the mobile station checks a state of a registration authentication success flag stored in a memory (S22). If the registration authentication success flag has been activated, the mobile station ignores the received authentication result message and maintains the normal operation state (S23). However, if the registration authentication success flag is not inactivated, the mobile station checks whether the registration authentication fail flag is in the active state (S24). When the registration authentication fail flag is in the inactive state, the mobile station is operated according to the authentication result message (S26). The authorized mobile station is thus prevented from being abnormally operated by the authentication failure of the unauthorized mobile station.

The method for processing the unauthorized mobile station in a state where the registration authentication success message of the authorized mobile station is transmitted to the unauthorized mobile station (in lock state) is described below with reference to FIG. 4.

While the unauthorized mobile station maintains the lock state, the authorized mobile station is turned off and on. If the authentication success message from registration authentication success of the authorized mobile station is transmitted to the unauthorized mobile station (S21), the unauthorized mobile station checks whether the registration authentication success flag is in the active state. When the registration authentication success flag is in the inactive state (S22), the unauthorized mobile station checks whether the registration authentication fail flag is in the active state (S24). When the registration authentication fail flag is in the active state, the unauthorized mobile station ignores the received authentication success message, and enters the lock state (S25). Accordingly, the unauthorized mobile station is prevented from being normally operated by the authentication success of the authorized mobile station.

As discussed above, the registration authentication success flag and the registration authentication fail flag may be set in a memory of the mobile station. In a registration authentication success, the mobile station sets the registration authentication success flag in the active state. In a registration authentication failure, the mobile station sets the registration authentication fail flag in the active state. When power is applied, the mobile station checks the state of the registration authentication fail flag. When the registration authentication fail flag is in the active state, the mobile station may directly enter the abnormal operation state without attempting the registration authentication. As a result, the load increase of the wireless network authentication system is prevented by preventing repeated processing of the registration authentication when power is repeatedly applied to the unauthorized mobile station.

Furthermore, when the registration authentication of the authorized mobile station succeeds and the authorized mobile station is normally operated, if the authorized mobile station receives the authentication fail message caused by the registration authentication failure of the unauthorized mobile station, the authorized mobile station checks the state of the registration authentication success flag. When the registration authentication success flag is in the active state, the authorized mobile station ignores the received authentication fail message and maintains the normal operation state. Accordingly, the authorized mobile station is not affected by the registration authentication failure of the unauthorized mobile station.

In one embodiment, a method for processing authentication of a mobile station in a mobile communication system comprises determining whether an authentication state is inactivated, and requesting registration. The method also comprises receiving a result message from a network, and activating the authentication state according to the result message.

The authentication state may be checked using a success flag or a fail flag. The success flag may be activated when the result message is a success message. The fail flag may be activated when the result message is a fail message. The activating the authentication state may comprise activating an authentication success state in response to activation of the success flag, and activating an authentication fail state in response to activation of the fail flag. The method may further comprise entering a lock state when the authentication state is activated as an authentication fail state.

In another embodiment, a method for processing authentication of a mobile station in a mobile communication system comprises receiving an authentication result message, and identifying whether an authentication flag is activated. The method also comprises determining processing operation of the authentication result message based on the activated authentication flag.

The determining processing operation may comprise ignoring the authentication result message when the activated authentication flag is a success flag, and entering a lock state when the activated authentication flag is a fail flag. A mobile station under normal operation may ignore the authentication result message.

In yet another embodiment, a method for processing authentication of a mobile station in a mobile communication system comprises receiving an authentication message from a network that sets an authentication flag as an authentication success flag, if an authentication attempt is successfully processed. The method also comprises receiving an authentication message from the network that sets the authentication flag as an authentication fail flag, if the authentication attempt fails. The method also comprises operating, according to an authentication determination by the network, based on a status of the authentication flag.

The method may further comprise storing the authentication flag in a memory. Authentication may be attempted with the network upon application of power. The method may further comprise entering a lock state when the authentication attempt is denied by the network. The method may further comprise entering a power down state when the authentication attempt is denied by the network.

The present invention may provide a method for processing authentication of an illegally duplicated mobile station in a mobile communication system which may continuously maintain a normal operation state of a normally registered and authenticated mobile station regardless of authentication failure of the illegally duplicated mobile station, by forming a registration authentication success flag in a memory of the mobile station, and making the mobile station set the registration authentication success flag in an active state when successfully processing registration authentication, and ignoring an authentication fail message resulting from registration authentication failure of the illegally duplicated mobile station on the basis of the active state of the registration authentication success flag when receiving the authentication fail message in the power application state.

The present invention may also provide a method for processing authentication of an illegally duplicated mobile station in a mobile communication system which may prevent repeated processing of authentication registration of a wireless network and load increase by preventing repeated attempts to registration authentication of an illegally duplicated mobile station when the illegally duplicated mobile station is repeatedly powered off and on, by forming a registration authentication fail flag in a memory of a mobile station, and making the mobile station check the state of the registration authentication fail flag in every power application state, attempt registration authentication when the registration authentication fail flag has been inactivated, and directly enter an abnormal operation state without attempting registration authentication when the registration authentication fail flag has been activated.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for authenticating a mobile station in a mobile communication system, the method comprising:
    determining whether an authentication state is inactivated;
    requesting registration when the authentication state is inactivated;
    receiving a result message from a network;
    activating a success flag or a fail flag according to the result message, the mobile station
    authorized upon activation of the success flag;
    receiving a subsequent result message after the success flag is activated for the authorized mobile station;
    ignoring the subsequent result message indicating an unauthorized state of an unauthorized mobile station; and
    maintaining normal operation of the authorized mobile station while the success flag is activated even when the subsequent result message is received.

2. The method of claim 1, wherein the authentication state is checked using the success flag or the fail flag.

3. The method of claim 2, further comprising:
    activating an authentication success state in response to activation of the success flag; and
    activating an authentication fail state in response to activation of the fail flag.

4. The method of claim 1, further comprising:
    entering a lock state for the unauthorized mobile station when the authentication state is activated as an authentication fail state.

5. A method for authenticating a mobile station in a mobile communication system, the method comprising:
    receiving an authentication result message;
    identifying an activated authentication flag;
    processing the authentication result message based on the activated authentication flag;
    receiving and ignoring a subsequent authentication result message when the activated authentication flag is a success flag for an authorized mobile station; and
    maintaining normal operation of the authorized mobile station even when the subsequent authentication result message is received by the authorized mobile station after the success flag is activated,
    wherein the subsequent authentication result message indicates an unauthorized state of an unauthorized mobile station.

6. The method of claim 5, further comprising:
    entering a lock state for the unauthorized mobile station when the activated authentication flag is a fail flag.

7. A method for authenticating a mobile station in a mobile communication system, the method comprising:

receiving an authentication message from a network that sets an authentication flag as an authentication success flag if an authentication attempt is successfully processed;

receiving an authentication message from the network that sets the authentication flag as an authentication fail flag if the authentication attempt fails;

operating, according to an authentication determination by the network, based on a status of the authentication flag;

receiving a subsequent authentication message after the authentication success flag is set for an authorized mobile station;

ignoring the subsequent authentication message indicating an unauthorized state of an unauthorized mobile station; and maintaining normal operation of the authorized mobile station once the success flag is set even when the subsequent authentication message is received.

8. The method of claim 7, further comprising:
storing the authentication flag in a memory.

9. The method of claim 7, wherein authentication is attempted with the network upon application of power to the mobile station.

10. The method of claim 7, further comprising:
entering a lock state for the unauthorized mobile terminal when the authentication attempt is denied by the network.

11. The method of claim 7, further comprising:
entering a power down state for the unauthorized mobile terminal when the authentication attempt is denied by the network.

12. A mobile station configured to perform authentication in a mobile communication system, the mobile station comprising:

means for determining whether an authentication state is inactivated;

means for requesting registration when the authentication state is inactivated;

means for receiving a result message from a network; and means for activating a success flag or a fail flag according to the result message, wherein once the success flag is activated, then the mobile station maintains normal operation when a subsequent result message is received indicating an unauthorized state of an unauthorized mobile station, ignoring the subsequent result message received after the success flag is activated.

13. The mobile station of claim 12, wherein the authentication state is checked using the success flag or the fail flag.

14. The mobile station of claim 13, wherein the means for activating the success flag or the fail flag is configured to:

activate an authentication success state in response to activation of the success flag; and activate an authentication fail state in response to activation of the fail flag for the unauthorized mobile station.

15. The mobile station of claim 12, wherein the unauthorized mobile station enters a lock state when the authentication state is activated as an authentication fail state while the mobile station remain in an authorized state.

* * * * *